US012613488B2

(12) United States Patent
Shibuya et al.

(10) Patent No.: US 12,613,488 B2
(45) Date of Patent: Apr. 28, 2026

(54) SHEET FEEDING DEVICE AND IMAGE FORMING APPARATUS INCLUDING SAME

(71) Applicant: KYOCERA Document Solutions Inc., Osaka (JP)

(72) Inventors: Takafumi Shibuya, Osaka (JP); Akira Ishii, Osaka (JP); Takehiro Sato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/083,015

(22) Filed: Mar. 18, 2025

(65) Prior Publication Data

US 2025/0298358 A1      Sep. 25, 2025

(30) Foreign Application Priority Data

Mar. 22, 2024      (JP) ................................. 2024-046575

(51) Int. Cl.
*G03G 15/00*          (2006.01)
*G01D 5/36*          (2006.01)

(52) U.S. Cl.
CPC ........... *G03G 15/6511* (2013.01); *G01D 5/36* (2013.01); *G03G 15/553* (2013.01)

(58) Field of Classification Search
CPC ..... G03G 15/6511; G03G 15/553; G01D 5/36
See application file for complete search history.

(56) References Cited

U.S. PATENT DOCUMENTS 4,929,822 A  *  5/1990  Nakamura  ............... G01D 5/36
                                                       369/44.37
2019/0193430 A1*  6/2019  Sato  ....................... B41J 11/425

FOREIGN PATENT DOCUMENTS

JP         H 10-007291 A       1/1998

* cited by examiner

*Primary Examiner* — David H Banh
(74) *Attorney, Agent, or Firm* — Stein IP, LLC

(57)                ABSTRACT

A rotation member is divided into a first detection region and a second detection region. A first interval in the circumferential direction between the detection target located at the tail end of the first detection region in the main rotation direction and the detection target located at the front end of the second detection region in the main rotation direction is less than a second interval in the circumferential direction between the detection target located at the tail end of the second detection region in the main rotation direction and the detection target located at the front end of the first detection region in the main rotation direction.

4 Claims, 12 Drawing Sheets

TIME    W

TIME   W

TIME   W

SHEET FEEDING DEVICE AND IMAGE FORMING APPARATUS INCLUDING SAME

INCORPORATION BY REFERENCE

This application is based upon and claims the benefit of priority from the corresponding Japanese Patent Application No. 2024-046575 filed on Mar. 22, 2024, the entire contents of which are incorporated herein by reference.

BACKGROUND

The present disclosure relates to a sheet feeding device and an image forming apparatus which includes the sheet feeding device.

A conventional sheet feeding device includes a main body unit, a sheet cassette, a lift plate, a lifting member, a coupling member, a motor, a control unit and an encoder. The sheet cassette can be fitted into the main body unit and pulled out from the main body unit. The lift plate is provided in the sheet cassette to be vertically displaceable. The lifting member is arranged below the lift plate, includes a turning shaft serving as a turning support point at one end in a feeding direction and turns upward the other end in the feeding direction to lift the lift plate.

The coupling member is provided in the main body unit, includes an engagement portion which engages a portion to be engaged on the side of the turning shaft when the sheet cassette is fitted in the main body unit and is driven and rotated in a main rotation direction to drive and rotate, in the main rotation direction, the portion to be engaged which has been engaged by the engagement portion. The motor is coupled to the coupling member, and rotates the turning shaft in the main rotation direction to turn the other end of the lifting member upward. The control unit controls the motor. The encoder outputs a pulse signal according to the rotation of the turning shaft. The control unit detects the remaining number of sheets on the lift plate based on the count value of the pulse signal obtained by counting.

When the sheet cassette is pulled out from the main body unit, the engagement of the engagement portion and the portion to be engaged is released. Here, the turning shaft is rotated in a reverse rotation direction to cause the lift plate to fall. The count value of the pulse signal is reset. Here, a rotation member is in a position before the sheet cassette is pulled out from the main body unit.

When the sheet cassette is fitted into the sheet cassette again, the control unit rotates the rotation member in the reverse rotation direction to return the rotation member to a home position. Thereafter, the rotation member is rotated in a forward rotation direction to cause the portion to be engaged to engage the engagement portion, and thus the lift plate is lifted. Here, the pulse signal is counted again. Then, a normal image formation (copying) operation is performed. In the copying operation, while the remaining number of sheets in the sheet cassette is being detected, the copying is performed.

In the conventional sheet feeding device, it is likely that the control unit erroneously determines that a rotation position different from the home position is the home position to rotate the rotation member, and thus the control unit starts lifting the lift plate. Here, it is likely that the remaining number of sheets is erroneously detected.

In view of the forgoing problem, an object of the present disclosure is to provide a sheet feeding device which can prevent an erroneous detection from occurring in the detection of the remaining number of sheets and an image forming apparatus which includes the sheet feeding device.

SUMMARY

In order to achieve the object described above, a sheet feeding device according to a first aspect of the present disclosure includes a main body unit, a sheet cassette, a lift plate, a lifting member, a coupling member, a motor, a control unit and an encoder. The sheet cassette can be fitted into the main body unit and pulled out from the main body unit. The lift plate is provided in the sheet cassette to be vertically displaceable. The lifting member is arranged below the lift plate, includes a turning shaft serving as a turning support point at one end in a feeding direction and turns upward the other end in the feeding direction to lift the lift plate. The coupling member is provided in the main body unit, includes an engagement portion which engages a portion to be engaged on a side of the turning shaft when the sheet cassette is fitted in the main body unit and is driven and rotated in a main rotation direction to drive and rotate, in the main rotation direction, the portion to be engaged which has been engaged by the engagement portion. The motor is coupled to the coupling member, and rotates the turning shaft in the main rotation direction to turn the other end of the lifting member upward. The control unit controls the motor. The encoder outputs a pulse signal according to the rotation of the turning shaft. The encoder includes a rotation member and an optical sensor. The rotation member is rotated in conjunction with the coupling member, and includes a plurality of detection targets arranged in a circumferential direction. The optical sensor includes a light emitting portion and a light receiving portion which are arranged opposite each other across a movement path of the detection targets, and changes a level of the pulse signal depending on whether light from the light emitting portion reaches the light receiving portion. The control unit detects a remaining number of sheets on the lift plate based on a count value of the pulse signal obtained by counting. The rotation member is divided into a first detection region and a second detection region. In the first detection region, only the detection target located at a tail end in the main rotation direction is formed longer in the circumferential direction than the other detection targets, and the detection targets are arranged at equal intervals in the circumferential direction. In the second detection region, the detection targets having the same circumferential length are arranged at equal intervals in the circumferential direction. The first detection regions and the second detection regions are alternatively arranged in the circumferential direction with the same pitch in the circumferential direction. A first interval in the circumferential direction between the detection target located at the tail end of the first detection region in the main rotation direction and the detection target located at a front end of the second detection region in the main rotation direction is less than a second interval in the circumferential direction between the detection target located at a tail end of the second detection region in the main rotation direction and the detection target located at a front end of the first detection region in the main rotation direction. The control unit rotates the rotation member in the main rotation direction from a home position located on the second interval to start detecting the remaining number of the sheets.

Further objects of the present disclosure and specific advantages obtained by the present disclosure will become more apparent from the following description of an embodiment.

DETAILED DESCRIPTION

An embodiment of the present disclosure will be described below using a tandem color laser printer as an example. The present disclosure is not limited to a printer, and can be applied to a multifunctional peripheral having a copying function and the like. The present disclosure is not limited to a color printer, and can be applied to a monochrome printer.

Configuration of Image Forming Apparatus

Figure 1:
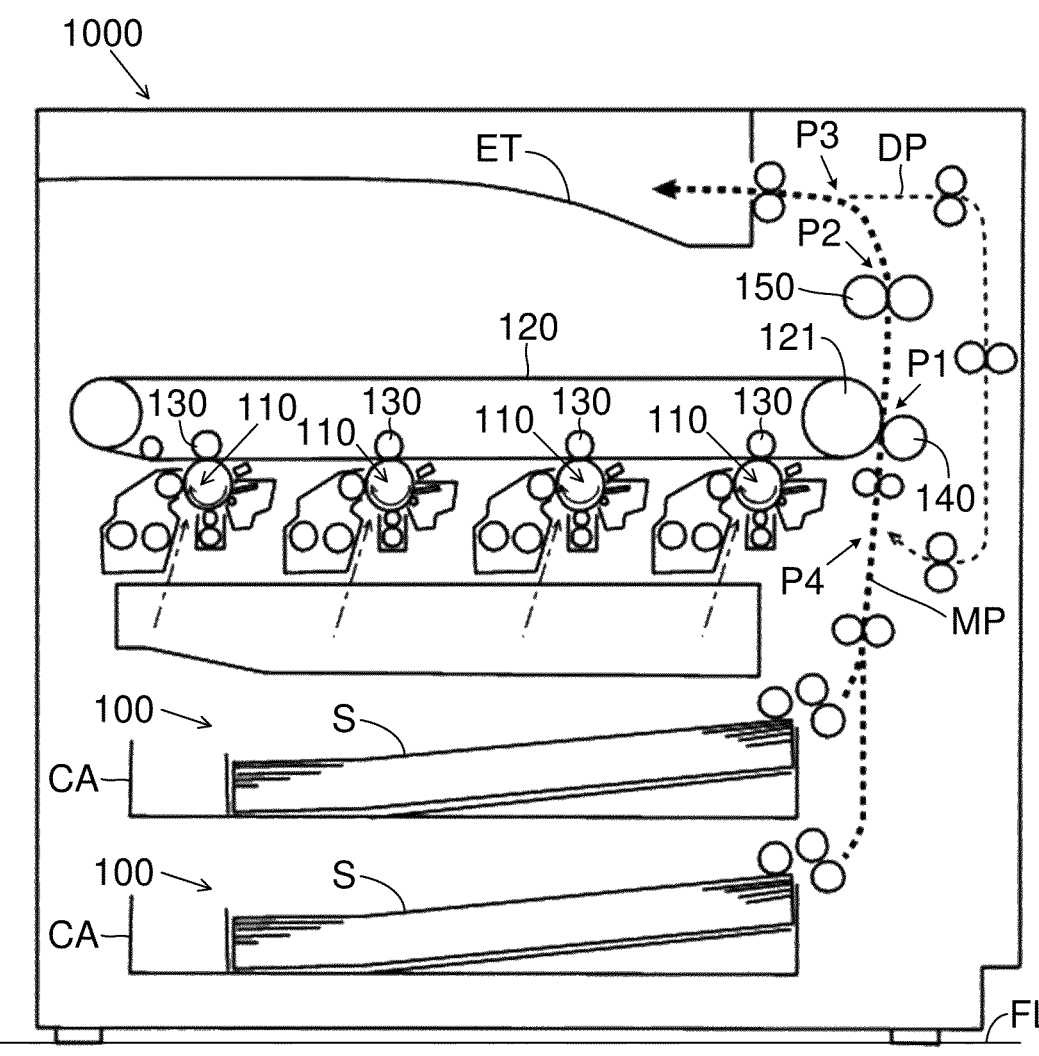
FIG. 1 is a schematic view of an image forming apparatus 1000 according to an embodiment of the present disclosure.

FIG. 1 is a schematic view of an image forming apparatus 1000 according to the present embodiment. The image forming apparatus 1000 is installed on a flat floor surface FL. The up/down direction of the image forming apparatus 1000 is a direction perpendicular to the floor surface FL.

The image forming apparatus 1000 includes a main conveyance path MP (indicated by a thick dashed line with an arrow). The main conveyance path MP reaches an ejection tray ET via a transfer position P1 and a fixing position P2.

In a print job, a sheet S is fed to the main conveyance path MP, and is conveyed along the main conveyance path MP. An image is formed using toners. Then, the image is printed on the sheet S being conveyed. In other words, transfer processing for transferring the image to the sheet S being conveyed is performed in the transfer position P1. In the fixing position P2, fixing processing for fixing the image on the sheet S is performed.

The image forming apparatus 1000 includes a conveyance roller pair (the symbol of which is omitted). The conveyance roller pair includes a pair of rollers which are pressed against each other. The conveyance roller pair includes an area between the rollers as a transfer nip. The conveyance roller pair is rotated to convey the sheet S which has reached the transfer nip. In other words, the conveyance roller pair nips the sheet S between the rollers, and is rotated in this state to convey the sheet S. The conveyance roller pair is arranged in the main conveyance path MP to convey the sheet S along the main conveyance path MP. The conveyance roller pair is arranged in a double-sided printing conveyance path DP (indicated by a thin dashed line with an arrow) which will be described later to convey the sheet S along the double-sided printing conveyance path DP.

The image forming apparatus 1000 includes a sheet feeding device 100. The sheet feeding device 100 feeds the sheet S to the main conveyance path MP. The configuration of the sheet feeding device 100 will be described in detail later.

The sheet feeding device 100 includes image formation units 110. The four image formation units 110 are provided. The four image formation units 110 correspond to the colors of cyan, magenta, yellow and black, respectively. The four image formation units 110 use toners of the corresponding colors to form images. Although attention is focused on a certain image formation unit 110, and the configuration thereof will be described below, the configurations of the four image formation units 110 are the same as each other. Hence, description of the configurations of the other image formation units 110 is omitted because the following description can used for the description.

Figure 2:
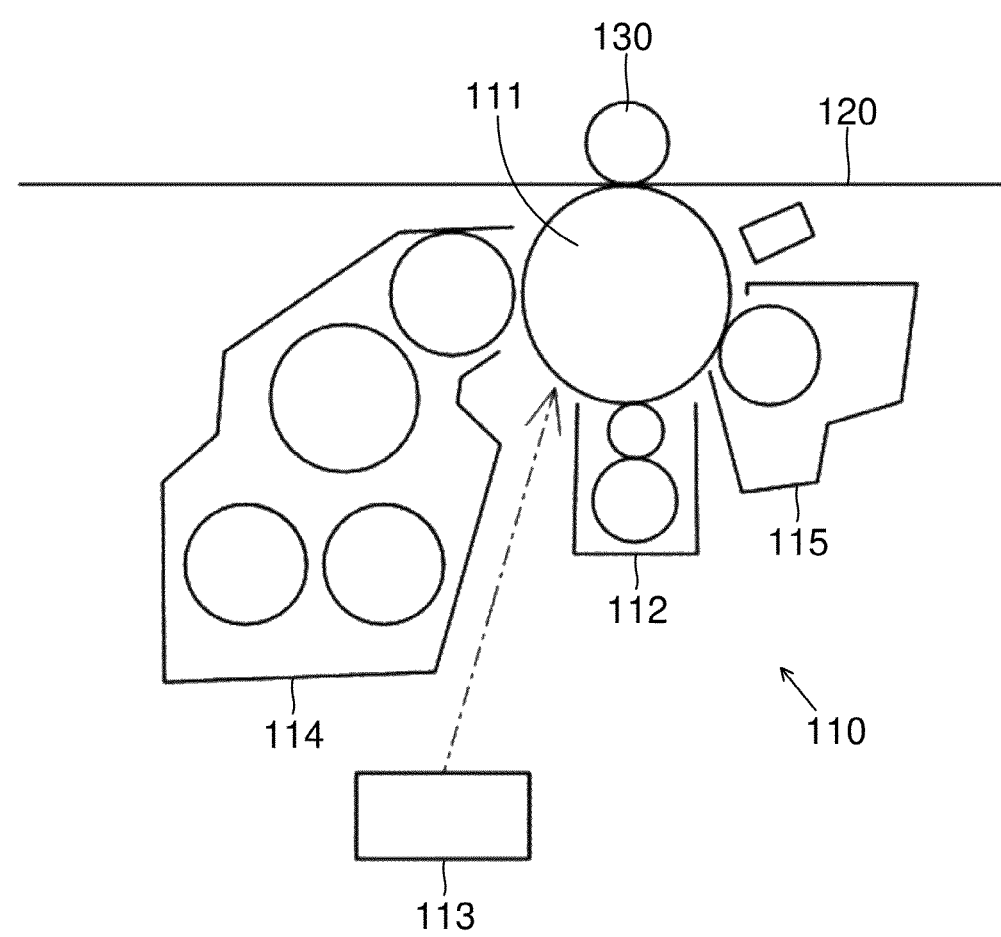
FIG. 2 is a schematic view of an image formation unit 110 in the embodiment of the present disclosure.

FIG. 2 is a schematic view of the image formation unit 110. The image formation unit 110 includes a photosensitive drum 111. The photosensitive drum 111 is rotatably supported. The image formation unit 110 carries the image formed with the toner on the outer circumferential surface of the photosensitive drum 111. The photosensitive drum 111 is rotated while carrying the toner image on the outer circumferential surface.

The image formation unit 110 includes a charging device 112, an exposure device 113, a development device 114 and a cleaning device 115. When the image formation unit 110 performs image formation, the photosensitive drum 111 is rotated. The charging device 112 charges the outer circumferential surface of the photosensitive drum 111. The exposure device 113 exposes the outer circumferential surface of the photosensitive drum 111 to form an electrostatic latent image on the outer circumferential surface of the photosensitive drum 111. The development device 114 supplies toner to the outer circumferential surface of the photosensitive drum 111, and develops the electrostatic latent image into the toner image. The toner image on the outer circumferential surface of the photosensitive drum 111 is primarily transferred to an intermediate transfer belt 120 which will be described later. The cleaning device 115 removes the toner which is left on the outer circumferential surface of the photosensitive drum 111 without being transferred to the intermediate transfer belt 120.

As shown in FIG. 1, the image forming apparatus 1000 includes the intermediate transfer belt 120. The intermediate transfer belt 120 is an endless belt. The intermediate transfer belt 120 is rotatably supported. The intermediate transfer belt 120 is tensioned over a plurality of tension rollers.

One of the tension rollers is coupled to a belt motor (not shown). In the following description, the tension roller which is coupled to the belt motor is referred to as a drive roller. In FIG. 1, among the tension rollers, a symbol of 121 is provided to the drive roller, and symbols for the other tension rollers are omitted. The drive roller 121 is rotated, and thus the intermediate transfer belt 120 is rotated to follow the rotation. The other tension rollers are rotated to follow the intermediate transfer belt 120.

The image forming apparatus 1000 includes primary transfer rollers 130. The four primary transfer rollers 130 are provided. The primary transfer rollers 130 are assigned to the colors of cyan, magenta, yellow and black, respectively. The primary transfer rollers 130 are arranged on the inner circumferential side of the intermediate transfer belt 120. The primary transfer rollers 130 are opposite the photosensitive drums 111 which carry the images of the corresponding colors via the intermediate transfer belt 120. The primary transfer rollers 130 are pressed against the photosensitive drums 111 which carry the images of the corresponding colors via the intermediate transfer belt 120.

The image forming apparatus 1000 includes a secondary transfer roller 140. The secondary transfer roller 140 is pressed against the outer circumferential surface of the intermediate transfer belt 120 in the transfer position P1. The secondary transfer roller 140 sandwiches the intermediate transfer belt 120 between the drive roller 121 and itself to form a transfer nip between the outer circumferential surface of the intermediate transfer belt 120 and itself. In this way, the transfer nip is formed in the transfer position P1. The main conveyance path MP extends through the transfer nip.

In the print job, the sheet S is conveyed toward the transfer position P1 (that is, the transfer nip). The sheet S being conveyed passes through the transfer nip.

The image formation units 110 uses the toners of the corresponding colors to form the images. The primary transfer rollers 130 primarily transfer the images to the outer circumferential surface of the intermediate transfer belt 120.

The intermediate transfer belt 120 is rotated while carrying the images primarily transferred from the photosensitive drums 111 on the outer circumferential surface. While the sheet S is passing through the transfer nip, the sheet S is brought into contact with the outer circumferential surface of the intermediate transfer belt 120. The secondary transfer roller 140 secondarily transfers the images to the sheet S passing through the transfer nip.

The image forming apparatus 1000 includes a fixing unit 150. The fixing unit 150 includes a heating roller and a pressure roller. The fixing unit 150 is arranged in the fixing position P2. The heating roller incorporates a heater. The pressure roller is pressed against the heating roller. The heating roller and the pressure roller are pressed against each other to form a fixing nip in the fixing position P2.

In the print job, the sheet S passes through the fixing position P2. In other words, the sheet S is sandwiched in the fixing nip. The fixing unit 150 heats the sheet S which is passing through the fixing position P2. In the fixing position P2, the sheet S is pressurized. The fixing unit 150 heats and pressurizes the sheet S to fix the toner images to the sheet S. The sheet S on which the fixing processing has been performed is ejected to the ejection tray ET.

The image forming apparatus 1000 can perform not only a single-sided print job for printing an image on the one surface of the sheet S but also a double-sided print job for printing images on the both surfaces of the sheet S. In order to perform the double-sided print job, the image forming apparatus 1000 includes the double-sided printing conveyance path DP.

The double-sided printing conveyance path DP branches, from the main conveyance path MP, in a branch position P3 on the downstream side of the main conveyance path MP with respect to the fixing position P2 in a sheet conveyance direction. The double-sided printing conveyance path DP merges with the main conveyance path MP in a merging position P4 on the upstream side of the main conveyance path MP with respect to the transfer position P1 in the sheet conveyance direction.

When the job to be performed is the single-sided print job, the sheet S passes through the transfer nip only once, and the transfer processing is performed once on the sheet S which is passing through the transfer nip. Then, after the first round of the transfer processing, the sheet S is ejected to the ejection tray ET without being processed.

When the job to be performed is the double-sided print job, the transfer processing is performed once on each of the front and back surfaces of the sheet S, and thus the sheet S passes through the transfer nip twice. Specifically, when the sheet S passes through the transfer nip for the first time, the transfer processing is performed on one surface of the sheet S. After the first round of the transfer processing, the sheet S is switched back after the back end of the sheet S passes through the branch position P3 and before the sheet S is completely ejected to the ejection tray ET. In this way, the sheet S is drawn into the double-sided printing conveyance path DP from the back end of the sheet S.

Thereafter, the sheet S is conveyed along the double-sided printing conveyance path DP. Then, the sheet S is returned from the double-sided printing conveyance path DP to the main conveyance path MP in the merging position P4. The sheet S which has been returned to the main conveyance path MP is conveyed along the main conveyance path MP, and passes through the transfer nip again. Here, the orientation of the front and back surfaces of the sheet S is reversed from the orientation when the sheet S passes through the transfer nip previously. In this way, when the sheet S passes through the transfer nip for the second time, the transfer processing is performed on the other surface opposite to the one surface of the sheet S.

Figure 3:
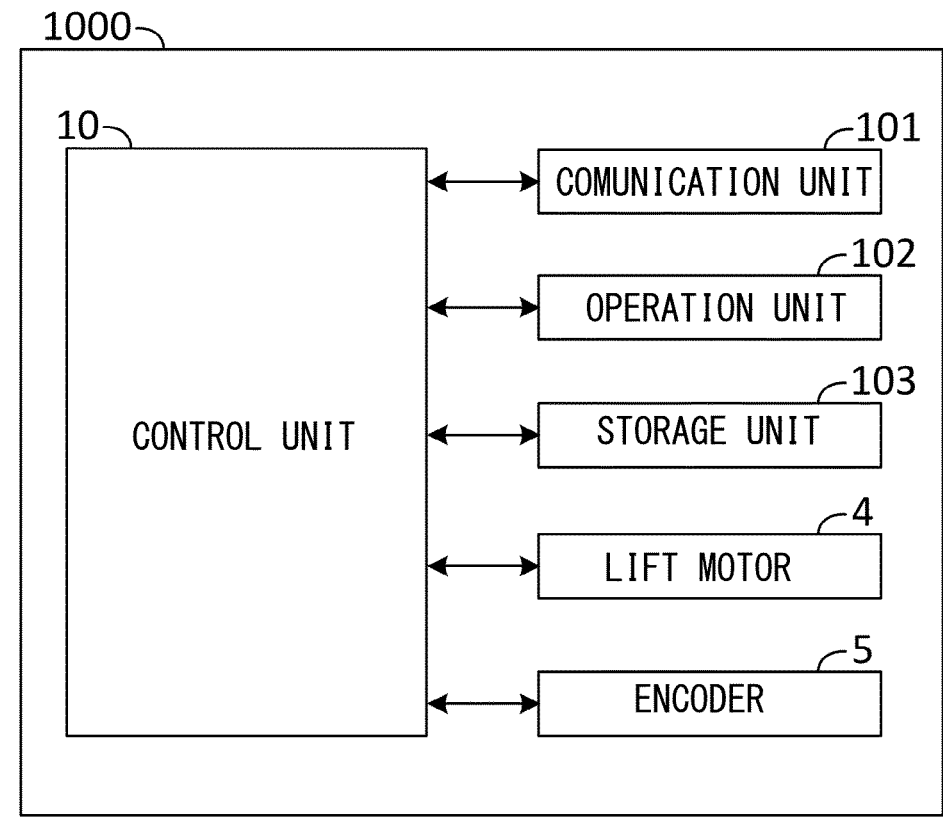
FIG. 3 is a block diagram of the image forming apparatus 1000 according to the embodiment of the present disclosure.

FIG. 3 is a block diagram of the image forming apparatus 1000. The image forming apparatus 1000 includes a control unit 10. The control unit 10 includes processing circuits such as a CPU and an ASIC. The control unit 10 also includes storage devices such as a ROM and a RAM. The control unit 10 controls the print job performed by the image forming apparatus 1000.

The control unit 10 controls the feeding of the sheet S performed by the sheet feeding device 100. Hence, the control unit 10 is said to be a component of the sheet feeding device 100. In other words, the sheet feeding device 100 includes the control unit 10. In addition feeding control unit which controls the feeding of the sheet S may be installed in the sheet feeding device 100.

The image forming apparatus 1000 includes a communication unit 101. The communication unit 101 includes a communication circuit, a communication memory, a communication connector and the like. The communication unit 101 is connected to external devices via a network such as a LAN to be able to communicate therewith. Examples of the external device include a user terminal. A personal computer (PC), a smartphone, a tablet computer and the like can serve as the user terminal.

The communication unit 101 is connected to the control unit 10. The control unit 10 uses the communication unit 101 to communicate with the external devices. For example, the external device transmits print data for the print job to the image forming apparatus 1000. The print data includes image data to be printed in the print job. The control unit 10 controls the print job based on the print data.

The image forming apparatus 1000 includes an operation unit 102. The operation unit 102 is an operation panel which includes a touch screen. The operation unit 102 receives a setting, an instruction and the like from a user. The operation unit 102 displays various types of information.

The operation unit 102 is connected to the control unit 10. The control unit 10 detects the setting, the instruction and the like received from the user. The control unit 10 controls the display of the operation unit 102.

The image forming apparatus 1000 includes a storage unit 103. Various storage devices such as a flash memory, a HDD and an SSD can be used as the storage unit 103. The storage unit 103 is connected to the control unit 10. The control unit 10 writes data to the storage unit 103 and reads data from the storage unit 103.

Configuration of Sheet Feeding Device

Figure 4:
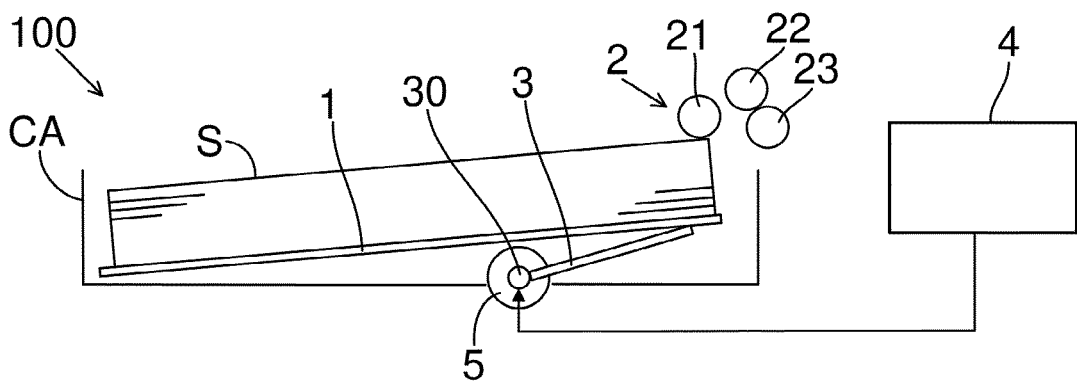
FIG. 4 is a schematic view of a sheet feeding device 100 according to the embodiment of the present disclosure.
Figure 4:
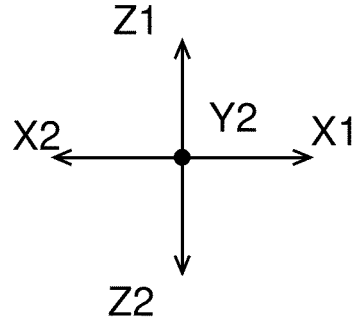

FIG. 4 is a schematic view of the sheet feeding device 100. In the following description, the feeding direction (X1-X2 direction) of the sheet S fed by the sheet feeding device 100 is simply referred to as a feeding direction. A direction (that is, one direction of a horizontal direction) orthogonal to the up/down direction (Z1-Z2 direction) and the feeding direction is referred to as a width direction (Y1-Y2 direction). The forward/backward direction (that is, the forward/backward direction of the sheet feeding device 100) of the image forming apparatus 1000 corresponds to the width direction. The sheet cassette CA is removable with respect to the apparatus main body (main body unit) 160 in the width direction. In FIG. 4, a direction perpendicular to the plane of the figure is the width direction.

The sheet feeding device 100 is arranged in a lower portion of the main body of the image forming apparatus 1000 (see FIG. 1). The sheet feeding device 100 includes the sheet cassette CA. The sheet cassette CA is fitted into the main body of the image forming apparatus 1000 (hereinafter simply referred to as the apparatus main body). The sheet cassette CA is removable with respect to the apparatus main body (main body unit) 160.

The sheets S are stored in the sheet cassette CA. In the print job, the sheets S in the sheet cassette CA are used. When the print job is performed, the sheets S in the sheet cassette CA are consumed and reduced. When the sheet cassette CA runs out of sheets S due to the performance of the print job, the sheet cassette CA is pulled out from the apparatus main body (main body unit) 160, the sheets S are stored in the sheet cassette CA and thereafter the sheet cassette CA is returned to the apparatus main body (main body unit) 160.

The number of sheet cassettes CA which can be fitted is not particularly limited. A plurality of sheet cassettes CA can be fitted into the apparatus main body (main body unit) 160, or one sheet cassette CA can be fitted into the apparatus main body (main body unit) 160. FIG. 1 shows, as an example, the image forming apparatus 1000 in which a plurality of sheet cassettes CA are fitted.

The sheet feeding device 100 includes a lift plate 1. The lift plate 1 is arranged in the sheet cassette CA. The sheets S are stored in the sheet cassette CA, and thus the sheets S are set on the lift plate 1. The lift plate 1 can be displaced such that an end on the downstream side in the feeding direction swings in the up/down direction (Z1-Z2 direction) with an end on the upstream side in the feeding direction serving as a support point. In other words, the lift plate 1 is supported to be vertically movable. In the following description, the upward movement of the lift plate 1 means that the end of the lift plate 1 on the downstream side X1 in the feeding direction is displaced upward Z1, and the downward movement of the lift plate 1 means that the end of the lift plate 1 on the downstream side X1 in the feeding direction is displaced downward Z2.

The sheet feeding device 100 includes a feeding unit 2. The feeding unit 2 makes contact with the sheet S on the lift plate 1 from above to draw the sheet S from the lift plate 1 and to feed the sheet S. In the print job, the sheet S is fed from the lift plate 1 to the main conveyance path MP, and an image is printed on the sheet S.

The feeding unit 2 includes a pickup roller 21. The pickup roller 21 is supported to be rotatable around a shaft extending in the width direction (Y1-Y2 direction). The pickup roller 21 is arranged in a position opposite the lift plate 1 in the up/down direction (Z1-Z2 direction). When the sheets S are set on the lift plate 1, the sheets S on the lift plate 1 are opposite the pickup roller 21 in the up/down direction (Z1-Z2 direction). The pickup roller 21 makes contact with the sheet S in the upmost layer on the lift plate 1 from above, and is rotated in this state. In this way, the sheet S is drawn from the lift plate 1 and is fed.

While the print job is being performed, the sheets S on the lift plate 1 are sequentially fed from the upmost layer. When the sheet S in the upmost layer is fed from the lift plate 1, the sheet S immediately below the sheet S which has been fed newly appears in the upmost layer. In other words, the sheets S on the lift plate 1 are reduced. Hence, the lift plate 1 repeats moving upward and stopping the upward movement. The lift plate 1 moves upward until the pickup roller 21 makes contact with the sheet S in the upmost layer on the lift plate 1, and stops the upward movement when the contact pressure of the sheet S in the upmost layer on the lift plate 1 and the pickup roller 21 reaches a predetermined value.

In this configuration, as the remaining number of sheets S on the lift plate 1 is decreased, the amount of upward movement of the lift plate 1 is increased. In this way, it is possible to detect the remaining number of sheets S on the lift plate 1 based on the amount of upward movement of the lift plate 1.

When the sheet S is drawn from the lift plate 1 by the pickup roller 21, in some cases, the sheet S in the upmost layer (here, referred to as a first sheet S) and the sheet S (here referred to as a second sheet S) immediately blow the first sheet S are stuck each other and are drawn from the sheet cassette CA. In other words, simultaneous feeding of the sheets S occurs. Hence, the feeding unit 2 includes a separation unit. The separation unit separates the second sheet S from the first sheet S, and feeds only the first sheet S. The configuration of the separation unit is not particularly limited. As the configuration of the separation unit, another configuration other than the following configuration may be adopted.

The separation unit includes, for example, a feeding roller 22 and a separation roller 23. Each of the feeding roller 22 and the separation roller 23 is supported to be rotatable around a shaft extending in the width direction. The feeding roller 22 is coupled to an unillustrated feeding motor, and is rotated by transmission of power from the feeding motor. The separation roller 23 is pressed against the feeding roller 22 to form a feeding nip between the feeding roller 22 and itself. The sheet S drawn from the lift plate 1 enters the feeding nip. The feeding roller 22 and the separation roller 23 are rotated to feed the sheet S which has entered the feeding nip to the main conveyance path MP.

The separation unit includes a torque limiter (not show). The torque limiter is arranged in the rotation shaft of the separation roller 23.

When a rotational driving force transmitted from the feeding roller 22 to the separation roller 23 is equal to or less than a threshold value, the torque limiter prevents the rotation shaft of the separation roller 23 from being rotated. In other words, the torque limiter prevents the rotation of the separation roller 23. When the first sheet S and the second sheet S are stuck each other and enter the feeding nip, the feeding roller 22 makes contact with the first sheet S to feed the first sheet S in the feeding direction but the separation roller 23 makes contact with the second sheet S without making contact with the first sheet S. Hence, the rotational driving force is unlikely to be transmitted from the feeding roller 22 to the separation roller 23. In this way, the rotational driving force transmitted from the feeding roller 22 to the separation roller 23 is equal to or less than the threshold value, and thus the separation roller 23 is prevented from being rotated.

While the feeding roller 22 is rotated, the separation roller 23 is not rotated, and thus the movement of the second sheet S which makes contact with the separation roller 23 without making contact with the feeding roller 22 in the feeding direction is suppressed. In this way, the first sheet S is separated from the second sheet S. In other words, the simultaneous feeding in which the first sheet S and the second sheet S are stuck each other and are fed is eliminated.

The sheet feeding device 100 includes a lifting member 3. The lifting member 3 is arranged in the sheet cassette CA. Specifically, the lifting member 3 is arranged below the lift plate 1. The lifting member 3 includes a turning shaft 30 with its axial direction being the width direction at an end on the upstream side in the feeding direction. The lifting member 3 can be displaced such that an end on the downstream side X1 in the feeding direction swings in the up/down direction (Z1-Z2 direction) with an end (that is, the turning shaft 30) on the upstream side X2 in the feeding direction serving as a support point.

The lifting member 3 causes the other end in the feeding direction (X1-X2 direction) to make contact with the lower surface of the lift plate 1. The lifting member 3 displaces upward Z1 the end on the downstream side X1 in the feeding direction with the end (that is, the turning shaft 30) on the upstream side X2 in the feeding direction serving as the support point, and thus the lift plate 1 is moved upward. In this way, the lifting member 3 causes the sheet S on the lift plate 1 to make contact with the feeding unit 2 (specifically, the pickup roller 21). In the following description, the part (that is, the end on the downstream side in the feeding direction) of the lifting member 3 which makes contact with the lower surface of the lift plate 1 is referred to as a lift plate contact portion.

The sheet feeding device 100 includes a lift motor (motor) 4. The lift motor 4 is coupled to the turning shaft 30 serving as the turning support point of the lifting member 3 via a shaft, a gear and the like which are not shown in the figure. The lift motor 4 is driven to rotate the turning shaft 30. In other words, the lift motor 4 is driven to displace the lift plate contact portion of the lifting member 3 upward Z1. In this way, the lift motor 4 moves the lift plate 1 upward.

The lift motor 4 is connected to the control unit 10. The control unit 10 controls the driving of the lift motor 4. In order to appropriately control the lift motor 4, the sheet feeding device 100 includes an upper surface detection mechanism (not shown) which detects the position of the sheet S in the upmost layer on the lift plate 1 in the up/down direction (Z1-Z2 direction). The upper surface detection mechanism outputs, to the control unit 10, a value corresponding to the contact pressure of the sheet S in the upmost layer on the lift plate 1 and the pickup roller 21.

When the sheets S on the lift plate 1 are fed and reduced, the control unit 10 moves the lift plate 1 upward. Then, when the contact pressure of the sheet S on the lift plate 1 and the pickup roller 21 reaches the predetermined value, the control unit 10 stops the upward movement of the lift plate 1. In other words, the control unit 10 stops the driving of the lift motor 4 when the sheet S on the lift plate 1 makes contact with the feeding unit 2. In this way, as the sheets S on the lift plate 1 are reduced, the lift plate 1 is moved upward.

The lift motor 4 is arranged in the apparatus main body (main body unit) 160. However, the sheet cassette CA is removable with respect to the apparatus main body (main body unit) 160 (see FIGS. 5 and 6). Hence, the turning shaft 30 is divided into a part on the side of the sheet cassette CA and a part on the side of the apparatus main body (main body unit) 160, and the two parts are coupled by a coupling mechanism.

Configuration of Coupling Mechanism

Figure 5:
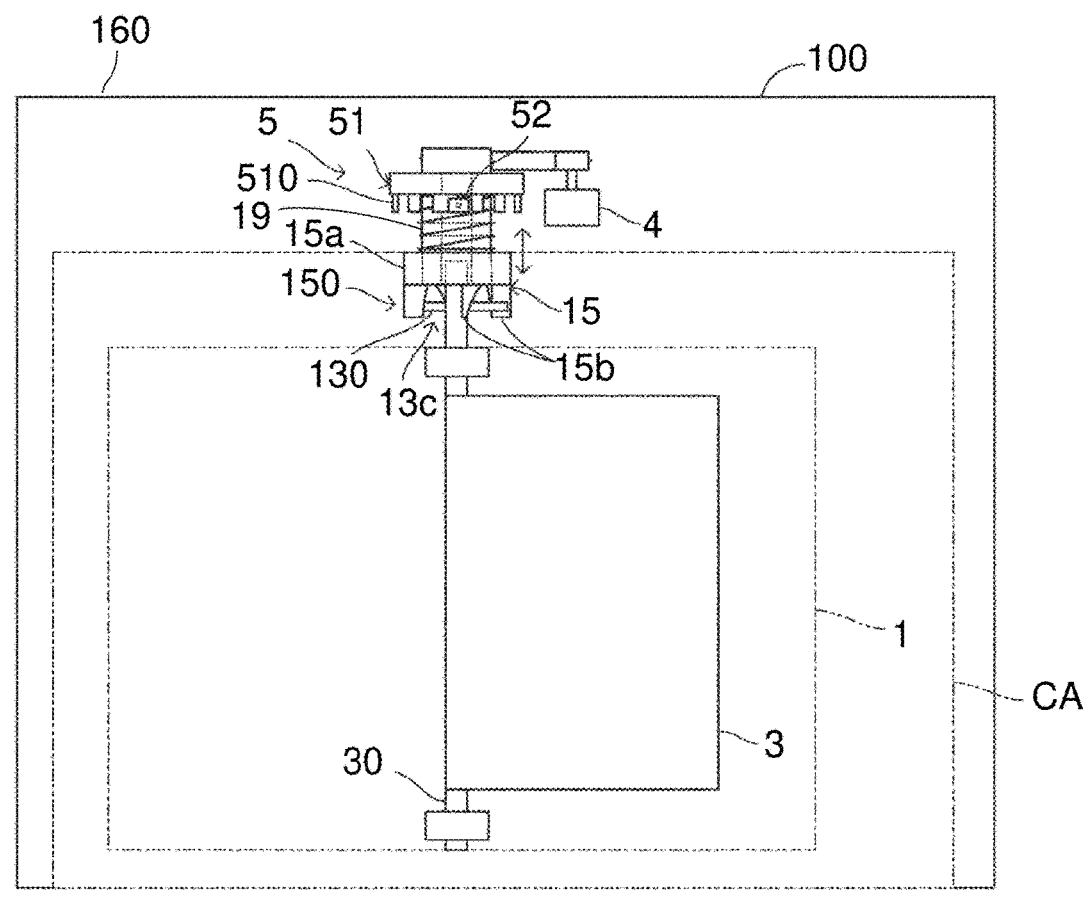
FIG. 5 is a plan view of the interior of the sheet feeding device 100 according to the embodiment of the present disclosure.
Figure 5:
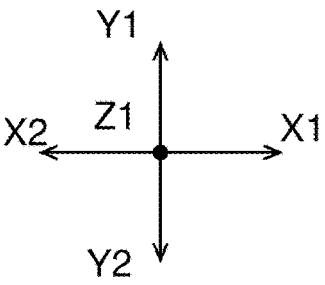
Figure 6:
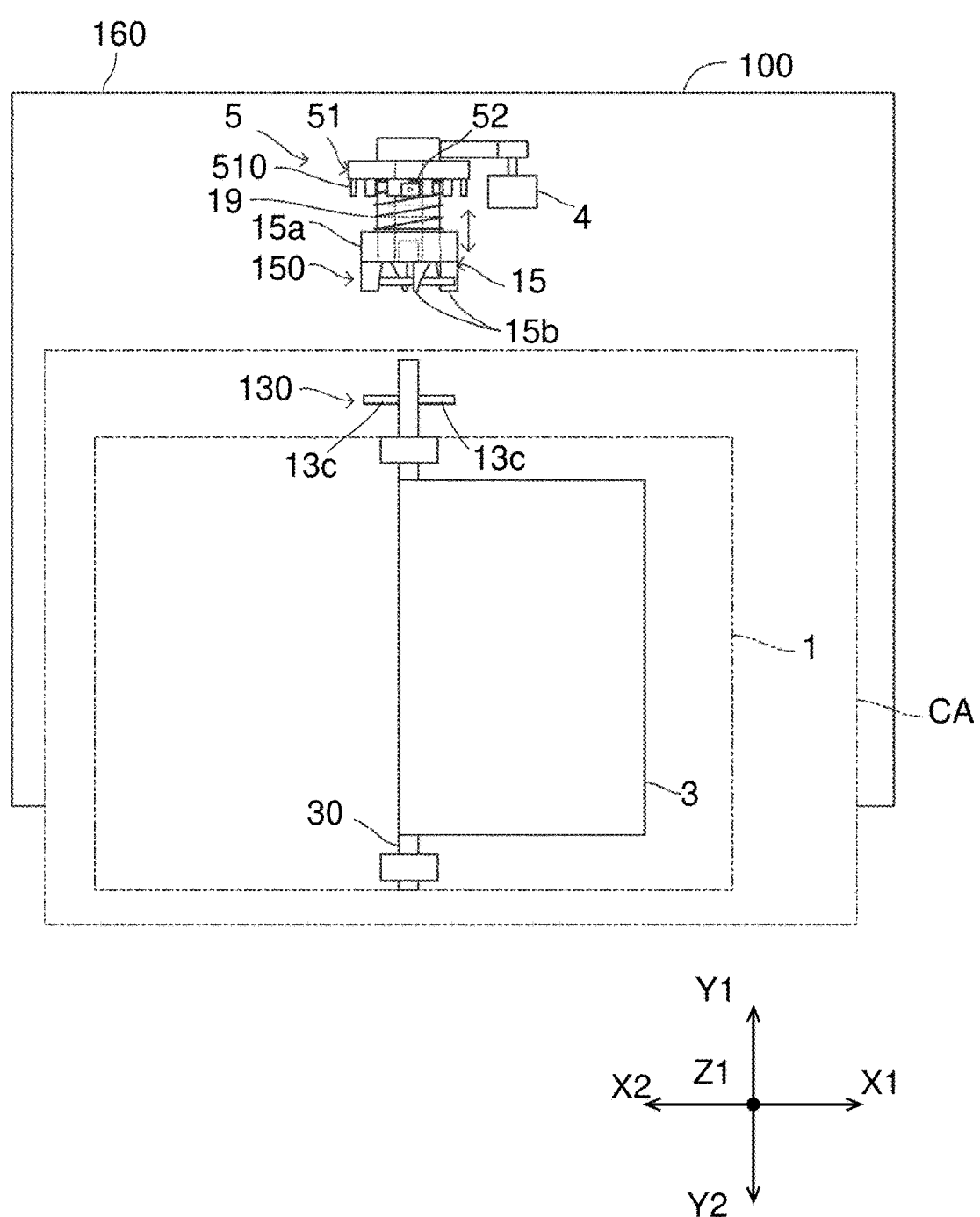
FIG. 6 is a plan view of the interior of the sheet feeding device 100 according to the embodiment of the present disclosure.

FIGS. 5 and 6 are plan views of the interior of the sheet feeding device 100. FIG. 5 shows a state where the sheet cassette CA has been fitted, and FIG. 6 shows a state where the sheet cassette CA has been pulled out. The turning shaft 30 includes a portion to be engaged 130 which is engaged by another member. The portion to be engaged 130 is driven and rotated in a main rotation direction R1, and thus the turning shaft 30 displaces the lift plate 1 upward.

In the present embodiment, the portion to be engaged 130 includes one or more overhang portions 13c which protrude radially from a part closer to one end of the turning shaft 30. For example, the overhang portions 13c are parallel pins which are fixed to the turning shaft 30. In other words, a pair of overhang portions 13c form 180° in the circumferential direction of the rotation of the turning shaft 30.

The sheet feeding device 100 includes a coupling member 15. The coupling member 15 is rotatably provided on the side of the apparatus main body (main body unit) 160, and includes a base portion 15a and an engagement portion 150. The base portion 15a is arranged separately from the portion to be engaged 130 in its axial direction (Y1-Y2 direction), and is driven and rotated by the lift motor 4.

Figure 8:
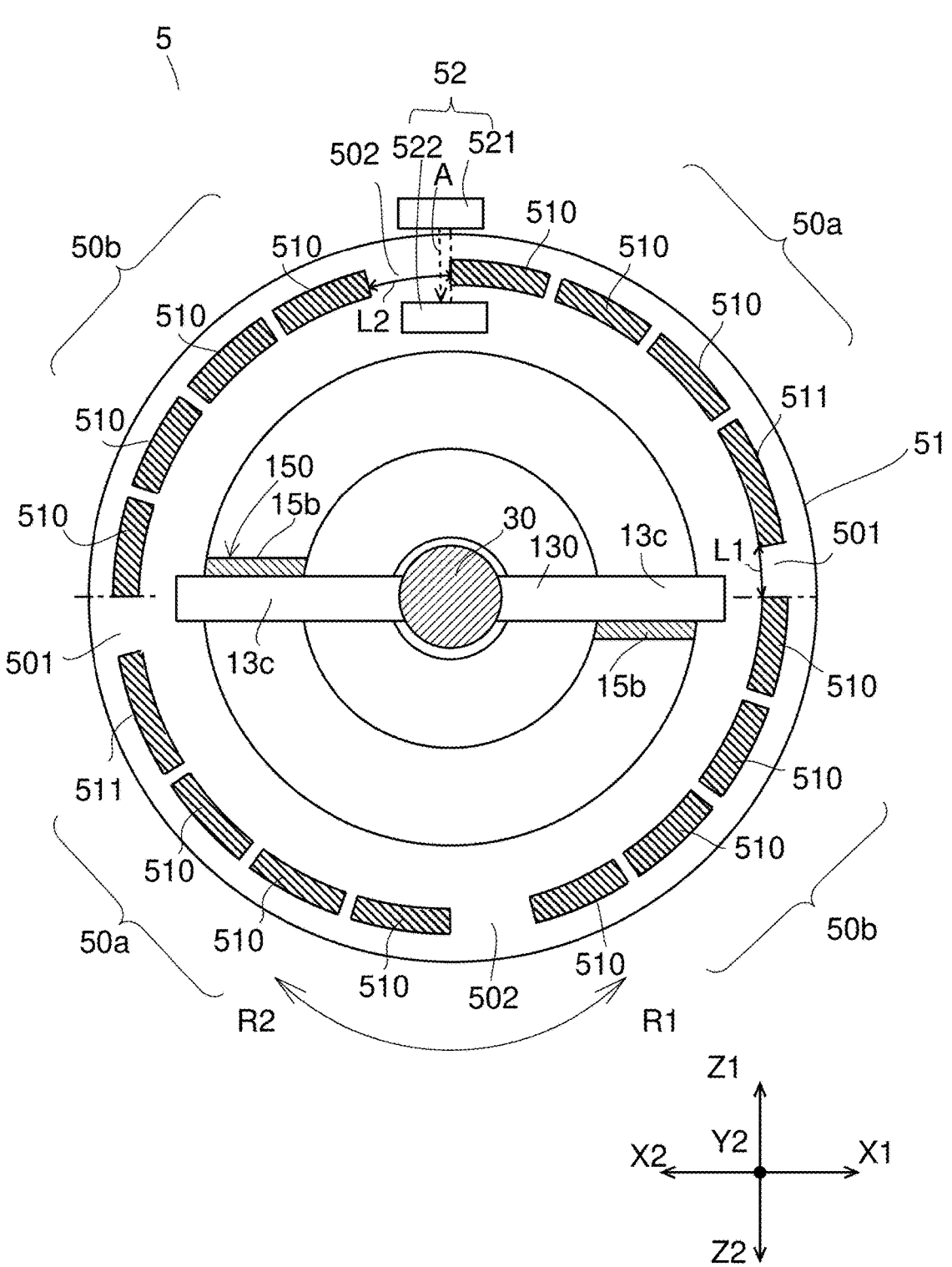
FIG. 8 is a plan view of the encoder 5 in the embodiment of the present disclosure.

In the present embodiment, the engagement portion 150 includes a plurality of protrusion portions 15b which protrude from the base portion 15a along the axial direction (Y1-Y2 direction) (see FIG. 8). The protrusion portions 15b are spaced in the circumferential direction. In the present embodiment, two protrusion portions 15b are provided at equal intervals of 180° in the circumferential direction. When the coupling member 15 is rotated in the circumferential direction, the two protrusion portions 15b engage the two overhang portions 13c. When the coupling member 15 is rotated 180° in a reverse direction in a state where the protrusion portions 15b engage the overhang portions 13c, the protrusion portions 15b engage the overhang portions 13c again. In other words, the phase of the coupling member 15 with respect to the turning shaft 30 is 180°.

When the sheet cassette CA is fitted in the apparatus main body (main body unit) 160, the engagement portion 150 engages the portion to be engaged 130 in the main rotation direction R1 (see FIG. 8). The coupling member 15 is driven and rotated in the main rotation direction R1 to drive and rotate the portion to be engaged 130 engaged by the engagement portion 150 in the main rotation direction R1. In this way, the turning shaft 30 is rotated in the main rotation direction R1.

In a state where the sheet cassette CA has been pulled out from the apparatus main body (main body unit) 160, the engagement of the engagement portion 150 and the portion to be engaged 130 is released (see FIG. 6). When the engagement of the engagement portion 150 and the portion to be engaged 130 is released, the overhang portions 13c are returned to positions shown in FIG. 8, the turning shaft 30 is rotated in a reverse rotation direction R2 and thus a lift member 12 is moved downward to an initial position. Here, a rotation member 51 is in a position before the sheet cassette CA is pulled out from the apparatus main body (main body unit) 160.

The lift motor 4 and the base portion 15a of the coupling member 15 are engaged in the main rotation direction R1 and the reverse rotation direction R2. The coupling member 15 is supported such that the coupling member 15 can be displaced from a reference position where the coupling member 15 can engage the portion to be engaged 130 with respect to the side of the portion to be engaged 130 in the axial direction (Y1-Y2 direction). A spring 19 elastically biases the coupling member 15 toward the reference position.

Configuration of Encoder

Figure 7:
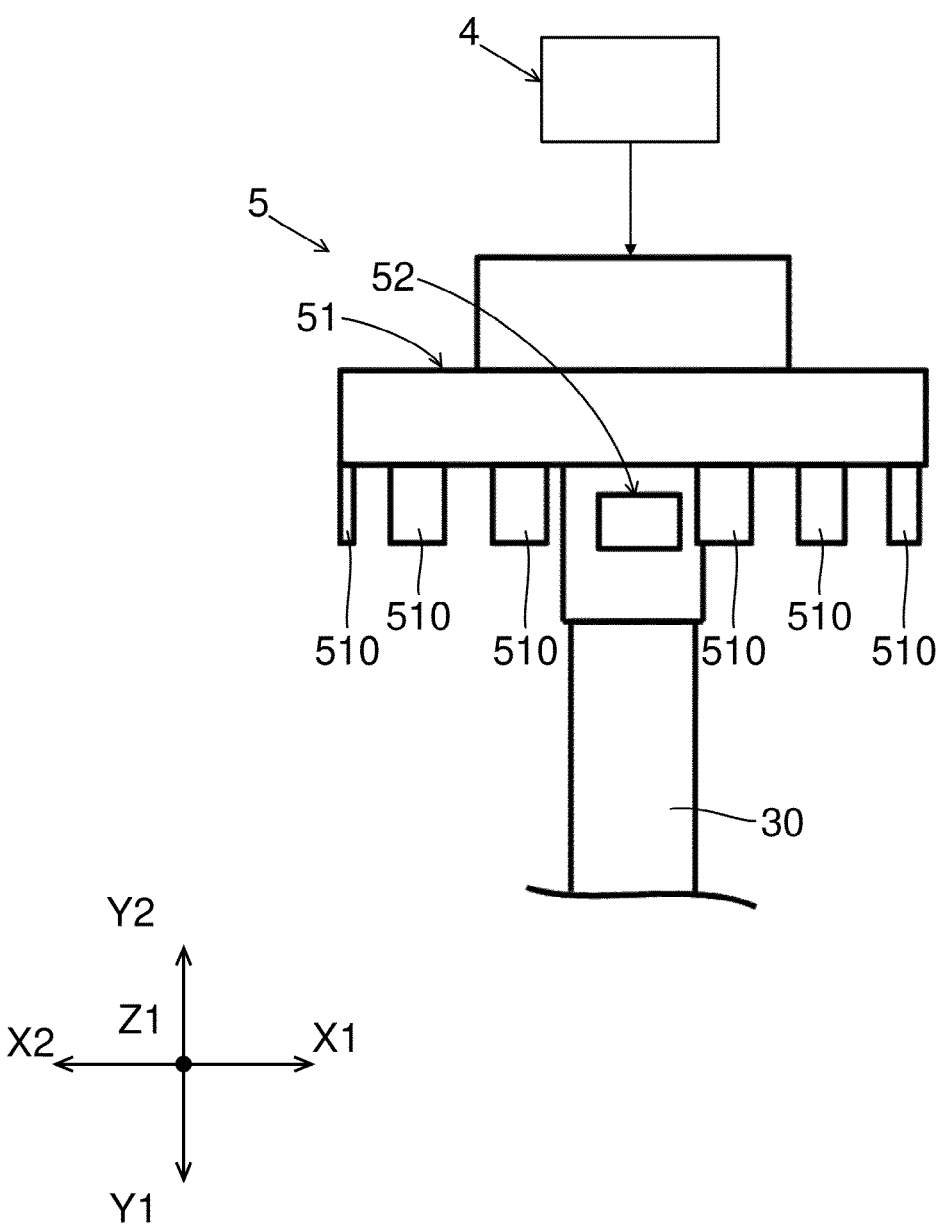
FIG. 7 is a schematic view of an encoder 5 in the embodiment of the present disclosure.
Figure 9:
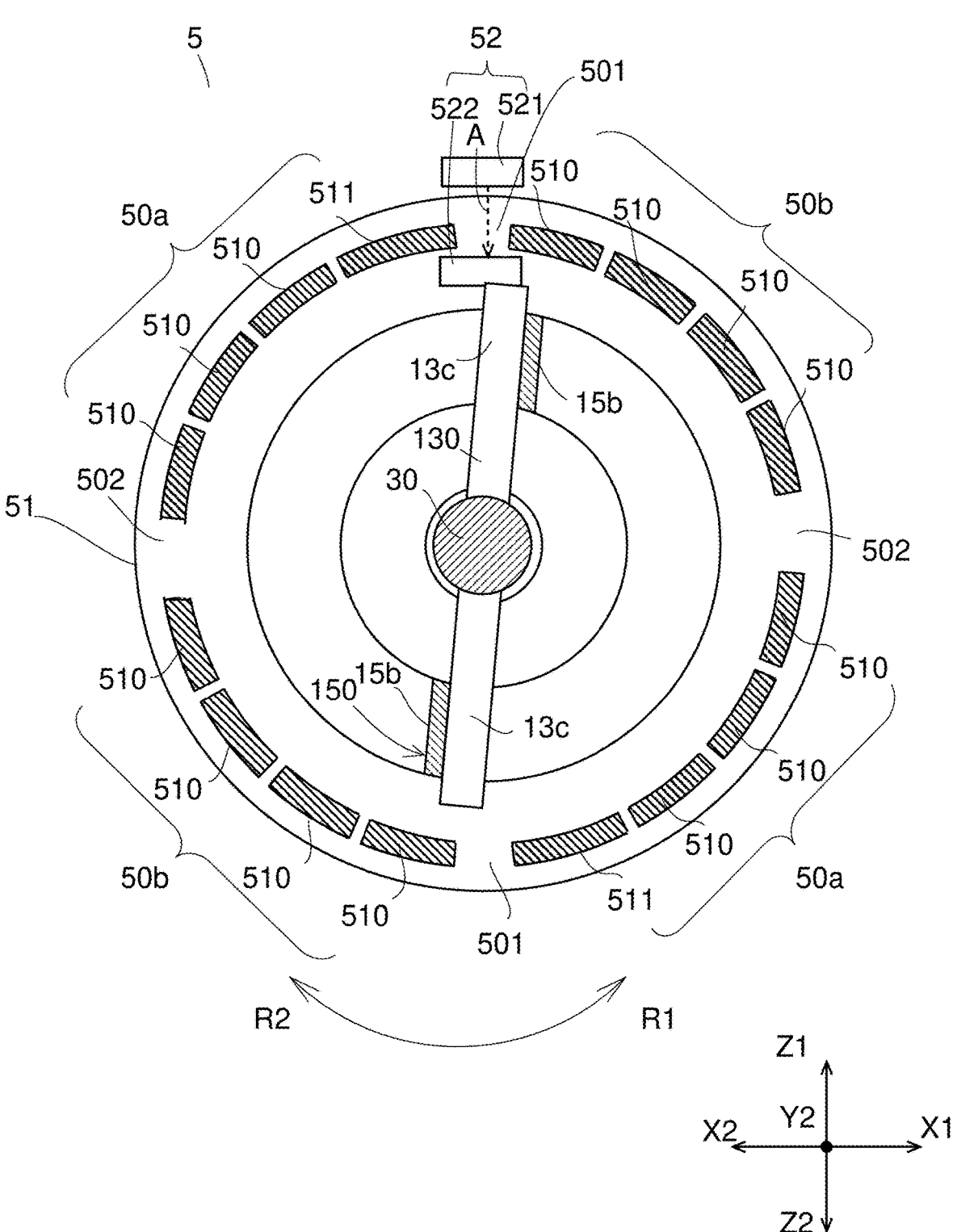
FIG. 9 is a plan view of the encoder 5 in the embodiment of the present disclosure.

FIG. 7 is a schematic view of an encoder 5. FIGS. 8 and 9 are plan views of the encoder 5, FIG. 8 shows a state where the rotation member 51 is in a home position and FIG. 9 shows a state where the rotation member 51 is located immediately in front of an upper limit detection position.

The sheet feeding device 100 includes the encoder 5 (see FIG. 4). The encoder 5 is arranged in the turning shaft 30 which is the turning support point of the lifting member 3. The encoder 5 outputs a pulse signal according to the rotation of the turning shaft 30. The vertical movement of the lift plate 1 is in synchronization with the rotation of the turning shaft 30, and the amount of upward movement of the lift plate 1 is changed according to the remaining number of sheets S on the lift plate 1. In this way, the encoder 5 outputs the pulse signal according to the remaining number of sheets S on the lift plate 1 (that is, the amount of upward movement of the lift plate 1).

The encoder 5 is connected to the control unit 10. The control unit 10 detects the amount of upward movement of the lift plate 1 based on the pulse signal output from the encoder 5. In other words, the control unit 10 determines the remaining number of sheets S on the lift plate 1 based on the pulse signal output from the encoder 5.

The encoder 5 includes the rotation member 51 and an optical sensor 52. The rotation member 51 is connected to the turning shaft 30. The rotation member 51 is in the shape of a disc with the turning shaft 30 in the center when viewed in the width direction (Y1-Y2 direction, that is, the axial direction of the turning shaft 30). The rotation member 51 is fixed to the turning shaft 30, and is rotated together with the turning shaft 30. When the turning shaft 30 is rotated, the rotation member 51 is rotated by the same angle as the rotation angle of the turning shaft 30. In the following description, the circumferential direction around the turning shaft 30 (that is, the direction of rotation of the rotation member 51) is simply referred to as the circumferential direction.

The rotation member 51 includes a plurality of detection pieces 510 and 511 which are spaced in the circumferential direction. The detection pieces 510 and 511 correspond to "detection targets". In FIGS. 8 and 9, in order to clarify the detection pieces 510 and 511, the detection pieces 510 and 511 are hatched.

When viewed in the width direction (Y1-Y2 direction), the detection pieces 510 and 511 are arranged on an outer edge portion of the rotation member 51 in a radial direction. The detection pieces 510 protrude in the width direction (Y1-Y2 direction).

When viewed in the radial direction (Y1-Y2 direction), the rotation member 51 is divided into first detection regions 50a and second detection regions 50b. The first detection regions 50a and the second detection regions 50b are alternatively arranged in the circumferential direction with the same pitch in the circumferential direction. In the present embodiment, two first detection regions 50a and two second detection regions 50b are provided with a pitch of 90° in the circumferential direction. In FIGS. 8 and 9, for convenience, the boundary between the first detection region 50a and the second detection region 50b adjacent to each other in the circumferential direction is indicated by alternate long and short dashed lines.

Specifically, in the first detection region 50a, only the detection piece (detection target) 511 located at the tail end in the main rotation direction R1 is formed longer in the circumferential direction than the other detection pieces (detection targets) 510, and the detection pieces (detection targets) 510 and 511 are arranged at equal intervals in the circumferential direction. In the first detection region 50a, the detection pieces (detection targets) 510 having the same circumferential length are arranged at equal intervals in the circumferential direction.

The length L1 of a first interval 501 in the circumferential direction between the detection piece (detection target) 511 located at the tail end of the first detection region 50a in the main rotation direction R1 and the detection piece (detection target) 510 located at the front end of the second detection region 50b in the main rotation direction R1 is less than the length L2 of a second interval 502 in the circumferential direction between the detection piece (detection target) 510 located at the tail end of the second detection region 50b in the main rotation direction R1 and the detection piece (detection target) 510 located at the front end of the first detection region 50a in the main rotation direction R1. The first interval 501 is greater than an interval between the detection piece (detection target) 510 and the detection piece (detection target) 510 in the first detection regions 50a.

In the present embodiment, in the rotation member 51, when viewed in the axial direction (Y1-Y2 direction), the detection pieces 510 and 511 are arranged in two-fold rotational symmetry, and the phase of the rotation member 51 in the circumferential direction is 180°. Hence, the phase of the rotation member 51 in the circumferential direction is the same as the phase of the coupling member 15 with respect to the turning shaft 30.

In the present embodiment, the second detection region 50b includes four detection pieces 510 which have the same length in the circumferential direction. The first detection region 50a includes three detection pieces 510 and one detection piece 511. The detection piece 511 is arranged at the tail end of the first detection region 50a in the main rotation direction R1, and is longer in the circumferential direction than the detection piece 510. Although in the present embodiment, four detection pieces are arranged in each of the first detection region 50a and the second detection region 50b, the number of detection pieces is not limited as long as the number is equal to or greater than two. The stages of the remaining number of sheets S which are detected and will be described later are determined according to the number of detection pieces. In the present embodiment, the remaining number of sheets S is detected in five stages.

The lift plate contact portion of the lifting member 3 is displaced in one direction of the circumferential direction, and thus the lift plate 1 is moved upward. In other words, the rotation member 51 is rotated in the one direction of the circumferential direction, and thus the lift plate 1 is moved upward. Here, the detection pieces 510 and 511 are moved in the circumferential direction.

The optical sensor 52 outputs the pulse signal. The output signal of the optical sensor 52 corresponds to the output signal (that is, the pulse signal) of the encoder 5. The optical sensor 52 changes the level of the pulse signal.

Only one optical sensor 52 is assigned to one sheet cassette CA. The optical sensor 52 is a transmission type which includes a light emitting portion 521 and a light receiving portion 522 (see FIG. 8). The light emitting portion 521 and the light receiving portion 522 are arranged opposite each other across the movement path of the detection pieces 510 and 511 in the circumferential direction. The optical sensor 52 is fixed to a predetermined position.

When one of the detection pieces 510 and 511 is present in an optical path A between the light emitting portion 521 and the light receiving portion 522, light from the light emitting portion 521 does not reach the light receiving portion 522. On the other hand, one of the detection pieces 510 and 511 is not present in the optical path A between the light emitting portion 521 and the light receiving portion 522, the light from the light emitting portion 521 reaches the light receiving portion 522. In FIGS. 8 and 9, the optical path A between the light emitting portion 521 and the light receiving portion 522 is indicated by a dashed line with an arrow.

The encoder 5 changes the level of the pulse signal depending on whether the light from the light emitting portion 521 reaches the light receiving portion 522. In other words, the encoder 5 changes the level of the pulse signal depending on whether the optical path A between the light emitting portion 521 and the light receiving portion 522 is blocked by one of the detection pieces 510 and 511.

For example, when the optical path A between the light emitting portion 521 and the light receiving portion 522 is blocked by one of the detection pieces 510 and 511, the encoder 5 outputs a high-level signal. When the optical path A between the light emitting portion 521 and the light receiving portion 522 is not blocked by one of the detection pieces 510 and 511, the encoder 5 outputs a low-level signal. A configuration may be adopted in which when the optical path A between the light emitting portion 521 and the light receiving portion 522 is not blocked by one of the detection pieces 510 and 511, the encoder 5 outputs the high-level signal, and when the optical path A between the light emitting portion 521 and the light receiving portion 522 is blocked by one of the detection pieces 510 and 511, the encoder 5 outputs the low-level signal.

When the optical path A between the light emitting portion 521 and the light receiving portion 522 is changed from a light-blocked state to a light-unblocked state, the pulse signal output from the encoder 5 falls, and when the optical path A between the light emitting portion 521 and the light receiving portion 522 is changed from the light-unblocked state to the light-blocked state, the pulse signal output from the encoder 5 rises.

Detection of Remaining Number of Sheets

For example, when the sheet cassette CA is fitted into the apparatus main body (main body unit) 160 or when the power of the image forming apparatus 1000 is turned on, the control unit 10 controls the driving of the lift motor 4 to rotate and move the rotation member 51 to the home position. Specifically, the home position of the rotation member 51 is aligned with the detection region (the optical path A between the light emitting portion 521 and the light receiving portion 522) of the optical sensor 52. In the present embodiment, the home position is located on the second interval 502 (see FIG. 8). An operation of returning to the home position will be described in detail later.

After the detection of the home position, the control unit 10 starts the upward movement of the lift plate 1. As described above, the lift plate 1 is moved upward until the sheet S in the upmost layer on the lift plate 1 makes contact with the pickup roller 21, and when the contact pressure of the sheet S in the upmost layer on the lift plate 1 and the pickup roller 21 reaches the predetermined value, the upward movement is stopped. For example, when sheets S are full on the lift plate 1 regarding the remaining number of sheets S on the lift plate 1, the control unit 10 performs the print job from a state where the optical sensor 52 detects the second interval 502.

The print job is performed, and thus the sheets S on the lift plate 1 are consumed and reduced. Accordingly, the lift motor 4 is driven, and thus the lift plate 1 is moved upward. Here, in order to move the lift plate 1 upward, the turning shaft 30 of the lifting member 3 is rotated. The rotation member 51 is rotated together with the turning shaft 30 in the main rotation direction R1.

Figure 10:
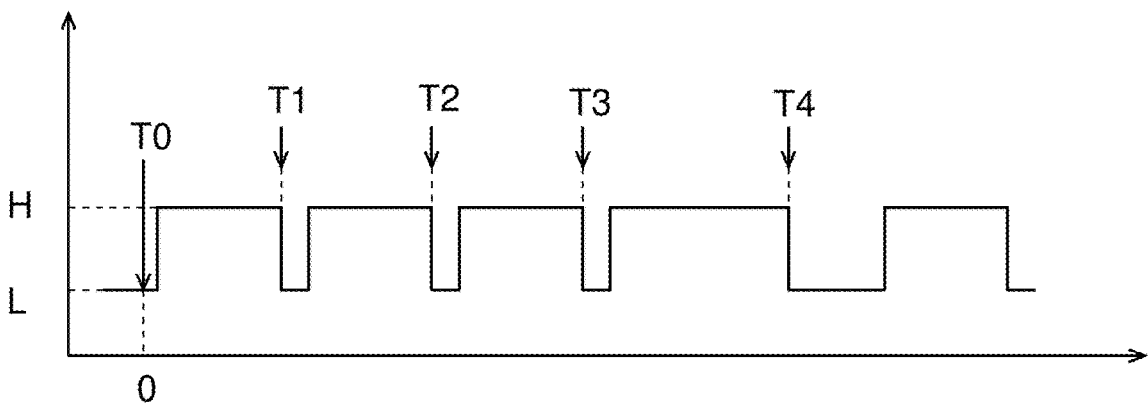
FIG. 10 is diagram showing a pulse signal which is output from the encoder 5 in the embodiment of the present disclosure.

The rotation member 51 is rotated, and thus the detection region of the optical sensor 52 is brought into the light-blocked state or the light-unblocked state. In other words, the pulse signal is output from the encoder 5. An example of the pulse signal output from the encoder 5 is shown in FIG. 10.

For example, the remaining number of sheets S on the lift plate 1 (ratio to the full load) is classified into five stages of 100%, 75%, 50%, 25% and 0%. The pitch in the first detection region 50a in the circumferential direction is greater than the maximum rotation angle which is permitted for the turning shaft 30.

In order to detect the remaining number of sheets S on the lift plate 1, the control unit 10 counts the pulse signal output from the encoder 5. The control unit 10 stores the count value of the pulse signal in the storage unit 103 (or the storage device of the control unit 10). The control unit 10 counts up the count value when the pulse signal changes from the high level to the low level. In other words, the control unit 10 counts up the count value each time the pulse signal falls. For example, when the pulse signal changes from the high level to the low level, the control unit 10 counts up the count value of the pulse signal by one. In an example shown in FIG. 10, the count value is counted up by one at each of times T1, T2, T3 and T4.

The control unit 10 determines the remaining number of sheets S on the lift plate 1 based on the count value of the pulse signal. Then, the control unit 10 causes the operation unit 102 to display remaining number information indicating the remaining number of sheets S on the lift plate 1. On the operation unit 102, as the remaining number information, any one of 100%, 75%, 50%, 25% and 0% is displayed.

In FIG. 10, at a time T0, the optical sensor 52 detects the home position in the second interval 502. Before the time T1, the count value is "0", and thus the remaining number of sheets S is determined to be 100%. At the time T1, the optical sensor 52 detects a gap between the detection pieces 510. Here, the count value is counted up by one, and thus the count value is changed to "1", with the result that the remaining number of sheets S is determined to be 75%.

At the time T2, the optical sensor 52 detects a gap between the detection pieces 510. Here, the count value is counted up by one, and thus the count value is changed to "2", with the result that the remaining number of sheets S is determined to be 50%. At the time T3, the optical sensor 52 detects a gap between the detection pieces 510. Here, the count value is counted up by one, and thus the count value is changed to "3", with the result that the remaining number of sheets S is determined to be 25%.

At the time T4, the optical sensor 52 detects the first interval 501. Here, the count value is counted up by one, and thus the count value is changed to "4", with the result that the remaining number of sheets S is determined to be 0%.

After the start of the upward movement of the lift plate 1, when the optical sensor 52 then detects the first interval 501, the control unit 10 determines that the remaining number of sheets S is equal to or less than a certain number. The time when the optical sensor 52 then detects the first interval 501 is the time T4 shown in FIG. 10.

Even when the control unit 10 determines that the remaining number of sheets S is 0%, a small number of sheets S are left on the lift plate 1. Hence, even when the control unit 10 determines that the remaining number of sheets S is 0%, the job can be performed.

In the control unit 10, when the lift plate 1 reaches an area immediately in front of the upper limit detection position, the optical sensor 52 detects the first interval 501 (see FIG. 9). When the sheets S on the lift plate 1 have run out, the control unit 10 moves the lift plate 1 downward, and causes the operation unit 102 to display an error message indicating that the sheets S have run out.

Operation of Returning to Home Position

In the image forming apparatus 1000, when the sheet cassette CA is pulled out from the apparatus main body (main body unit) 160, the count value is erased from the storage unit 103 and is reset. Hence, when the sheet cassette CA is fitted into the apparatus main body (main body unit) 160, the control unit 10 controls the driving of the lift motor 4 to temporarily return the rotation member 51 to the home position. After the rotation member 51 is returned to the home position, the lift plate 1 is lifted. Here, the pulse signal is counted again, the remaining number of sheets is detected as described above and a normal image formation (copying) operation is performed.

Figure 11:
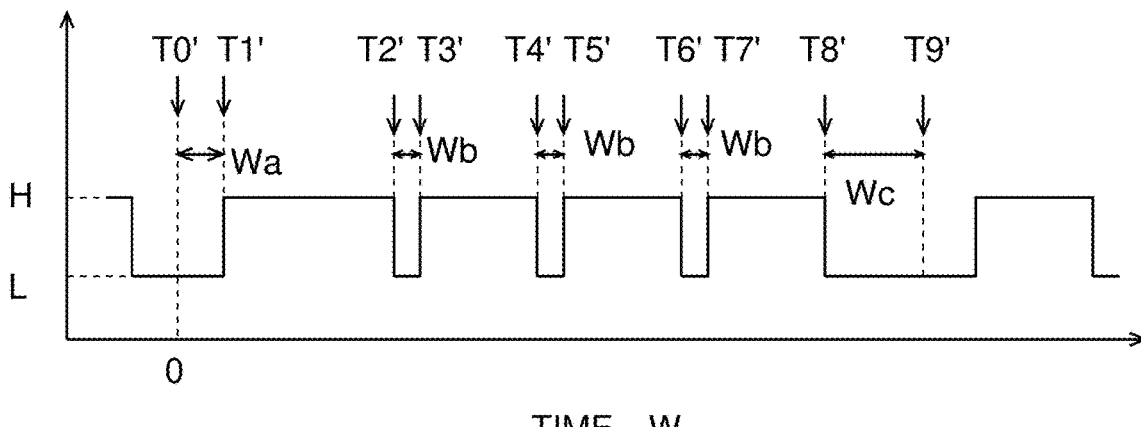
FIG. 11 is diagram showing a pulse signal which is output from the encoder 5 in the embodiment of the present disclosure.

Specifically, the control unit 10 rotates, in the reverse rotation direction R2, the rotation member 51 which is in a position before the sheet cassette CA is pulled out from the apparatus main body (main body unit) 160. The rotation member 51 is rotated in the reverse rotation direction R2, and thus the detection region of the optical sensor 52 is brought into the light-blocked state or the light-unblocked state. For example, FIG. 11 shows an example of the pulse signal output from the encoder 5 when the rotation member 51 is returned to the home position from a state where the rotation member 51 is located immediately in front of the upper limit detection position.

In order to return the rotation member 51 to the home position, the control unit 10 counts the pulse signal output from the encoder 5. Specifically, while the rotation member 51 is being rotated at a predetermined speed in the reverse rotation direction R2, the detection time W of the low level is counted. At a time T0', the optical sensor 52 detects the first interval 501. At a time T1', the optical sensor 52 detects the detection piece 511. Here, a detection time Wa is detected between the time T0' and the time T1'.

Between a time T2' and a time T3', the optical sensor 52 detects a gap between the detection piece 511 and detection piece 510. Here, a detection time Wb is detected. Between a time T4' and a time T5' and between a time T6' and a time T7', the optical sensor 52 detects gaps between the detection pieces 511. Here, the detection times Wb are detected. Between a time T8' and a time T9', a detection time Wc is detected. The detection time Wc is a time which is previously stored in the storage unit 103 to detect the second interval 502. Hence, when the detection time Wc is detected, the control unit 10 determines that the optical path A of the optical sensor 52 is present on the second interval 502, the control unit 10 stops the rotation of the rotation member 51. Thereafter, the control unit 10 rotates the rotation member 51 in the main rotation direction R1 to move the rotation member 51 to the home position which the optical path A is located in the second interval 502.

Figure 12:
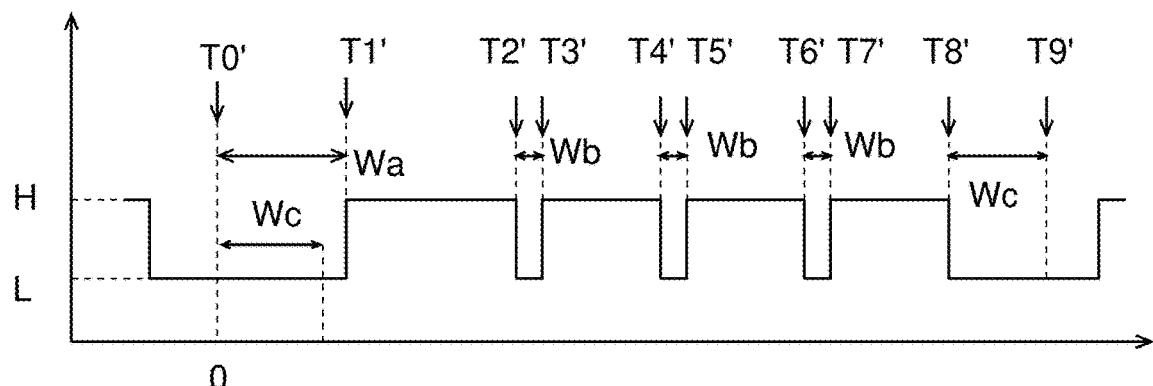
FIG. 12 is diagram showing a pulse signal which is output from a conventional encoder 5.

As a conventional problem, when the length L1 of the first interval 501 in the circumferential direction is equal to the length L2 of the second interval 502 in the circumferential direction, the detection time Wa detected between the time T0' and the time T1' may be longer than the detection time Wc. An example of the pulse signal output from the encoder 5 at that time is shown in FIG. 12. When the rotation member 51 is moved to the home position from the state where the rotation member 51 is located immediately in front of the upper limit detection position, if the length L1 of the first interval 501 in the circumferential direction is longer, the detection time Wa detected between the time T0' and the time T1' may be longer than the detection time Wc. Here, when the control unit 10 first detects the detection time Wc after the start of the operation of returning to the home position, the control unit 10 determines that the optical path A of the optical sensor 52 is located on the second interval 502. Hence, although the optical path A of the optical sensor 52 is actually located on the first interval 501, the control unit 10 may erroneously determine that the optical path A of the optical sensor 52 is located on the second interval 502 to erroneously detect the home position. Therefore, for example, although the sheet cassette CA is pulled out, and the sheets S are placed, the control unit 10 may determine that the remaining number of sheets S is 0% to erroneously detect the remaining number of sheets.

By contrast, in the present embodiment, the length L1 of the first interval 501 in the circumferential direction is formed to be less than the length L2 of the second interval 502 in the circumferential direction. Hence, even when the rotation member 51 is moved to the home position from the state where the rotation member 51 is located immediately in front of the upper limit detection position, the detection time Wa detected between the time T0' and the time T1' can be prevented from being longer than the detection time Wc. In this way, it is possible to prevent the remaining number of sheets from being erroneously detected due to the erroneous detection of the home position.

The embodiment disclosed herein should be considered to be illustrative in all respects and not restrictive. The scope of the present disclosure is indicated not by the description of the above embodiment but by the scope of claims, and furthermore, meanings equivalent to the scope of claims and all changes in the scope are included therein.

What is claimed is:

1. A sheet feeding device comprising:
a main body unit;
a sheet cassette that can be fitted into the main body unit and pulled out from the main body unit;
a lift plate that is provided in the sheet cassette to be vertically displaceable;
a lifting member that
  is arranged below the lift plate,
  includes a turning shaft serving as a turning support point at one end in a feeding direction and
  turns upward the other end in the feeding direction to lift the lift plate;
a coupling member that
  is provided in the main body unit,
  includes an engagement portion which engages a portion to be engaged on a side of the turning shaft when the sheet cassette is fitted in the main body unit and
  is driven and rotated in a main rotation direction to drive and rotate, in the main rotation direction, the portion to be engaged which has been engaged by the engagement portion;
a motor that
  is coupled to the coupling member, and
  rotates the turning shaft in the main rotation direction to turn the other end of the lifting member upward;
a control unit that controls the motor; and
an encoder that outputs a pulse signal according to the rotation of the turning shaft,
wherein the encoder includes:
  a rotation member that
    is rotated in conjunction with the coupling member, and
    includes a plurality of detection targets arranged in a circumferential direction; and
  an optical sensor that
    includes a light emitting portion and a light receiving portion which are arranged opposite each other across a movement path of the detection targets, and changes a level of the pulse signal depending on whether light from the light emitting portion reaches the light receiving portion,
the control unit detects a remaining number of sheets on the lift plate based on a count value of the pulse signal obtained by counting,
the rotation member is divided into a first detection region and a second detection region,
in the first detection region, only the detection target located at a tail end in the main rotation direction is formed longer in the circumferential direction than the other detection targets, and the detection targets are arranged at equal intervals in the circumferential direction,
in the second detection region, the detection targets having a same circumferential length are arranged at equal intervals in the circumferential direction,
the first detection regions and the second detection regions are alternatively arranged in the circumferential direction with a same pitch in the circumferential direction,
a first interval in the circumferential direction between the detection target located at the tail end of the first detection region in the main rotation direction and the detection target located at a front end of the second detection region in the main rotation direction is less than a second interval in the circumferential direction between the detection target located at a tail end of the second detection region in the main rotation direction and the detection target located at a front end of the first detection region in the main rotation direction and
the control unit rotates the rotation member in the main rotation direction from a home position located on the second interval to start detecting the remaining number of the sheets.

2. The sheet feeding device according to claim 1, wherein a phase of the rotation member in the circumferential direction is equal to a phase of the coupling member 15 relative to the turning shaft 30.

3. The sheet feeding device according to claim 2, wherein each of the phase of the rotation member in the circumferential direction and the phase of the coupling member 15 relative to the turning shaft 30 is 180°.

4. An image forming apparatus comprising:
the sheet feeding device according to claim 1,
wherein an image is printed on the sheet fed from the sheet feeding device.

* * * * *